(12) United States Patent
Guan et al.

(10) Patent No.: US 12,632,390 B2
(45) Date of Patent: May 19, 2026

(54) COMPUTING SYSTEM AND MEMORY SHARING METHOD FOR COMPUTING SYSTEM

(71) Applicant: ALIBABA (CHINA) CO., LTD., Zhejiang Province (CN)

(72) Inventors: Tianchan Guan, Shanghai (CN); Dimin Niu, San Mateo, CA (US); Yijin Guan, Beijing (CN); Hongzhong Zheng, Los Gatos, CA (US)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 488 days.

(21) Appl. No.: 18/322,954

(22) Filed: May 24, 2023

(65) Prior Publication Data

US 2024/0069954 A1     Feb. 29, 2024

(30) Foreign Application Priority Data

Aug. 31, 2022    (CN) ......................... 202211061258.3

(51) Int. Cl.
*G06F 12/10* (2016.01)
*G06F 9/455* (2018.01)

(52) U.S. Cl.
CPC .......... *G06F 12/10* (2013.01); *G06F 9/45558* (2013.01); *G06F 2009/4557* (2013.01); *G06F 2009/45583* (2013.01)

(58) Field of Classification Search
CPC ......... G06F 9/45558; G06F 2009/4557; G06F 2009/45583; G06F 12/1072; G06F 12/109; G06F 12/10
USPC .......................................................... 718/1
See application file for complete search history.

(56) References Cited

U.S. PATENT DOCUMENTS

| | | | | |
|---|---|---|---|---|
| 9,940,287 | B2 * | 4/2018 | Das Sharma | ......... G06F 15/167 |
| 10,114,760 | B2 * | 10/2018 | Molnar | .............. G06F 12/1027 |
| 10,769,076 | B2 * | 9/2020 | Duncan | .............. G06F 12/1027 |
| 2016/0077976 | A1 * | 3/2016 | Raikin | .................... G06F 13/28 |
| | | | | 711/207 |
| 2021/0132999 | A1 * | 5/2021 | Haywood | ............... G06F 9/544 |
| 2021/0397566 | A1 * | 12/2021 | Goss | ...................... G06F 3/0659 |
| 2022/0004488 | A1 * | 1/2022 | Paul | .................... G06F 12/0646 |
| 2023/0385220 | A1 * | 11/2023 | Li | ........................ G06F 13/1663 |

* cited by examiner

*Primary Examiner* — Jacob D Dascomb
(74) *Attorney, Agent, or Firm* — WPAT, P.C.; Anthony King

(57) ABSTRACT

The present application discloses a computing system and a memory sharing method for a computing system. The computing system includes a first host, a second host, a first memory extension device and a second memory extension device. The first memory extension device is coupled to the first host. The second memory extension device is coupled to the second host and the first memory extension device. The first host accesses a memory space of a memory of the second host through the first memory extension device and the second memory extension device according to a first physical address of the first host.

12 Claims, 5 Drawing Sheets

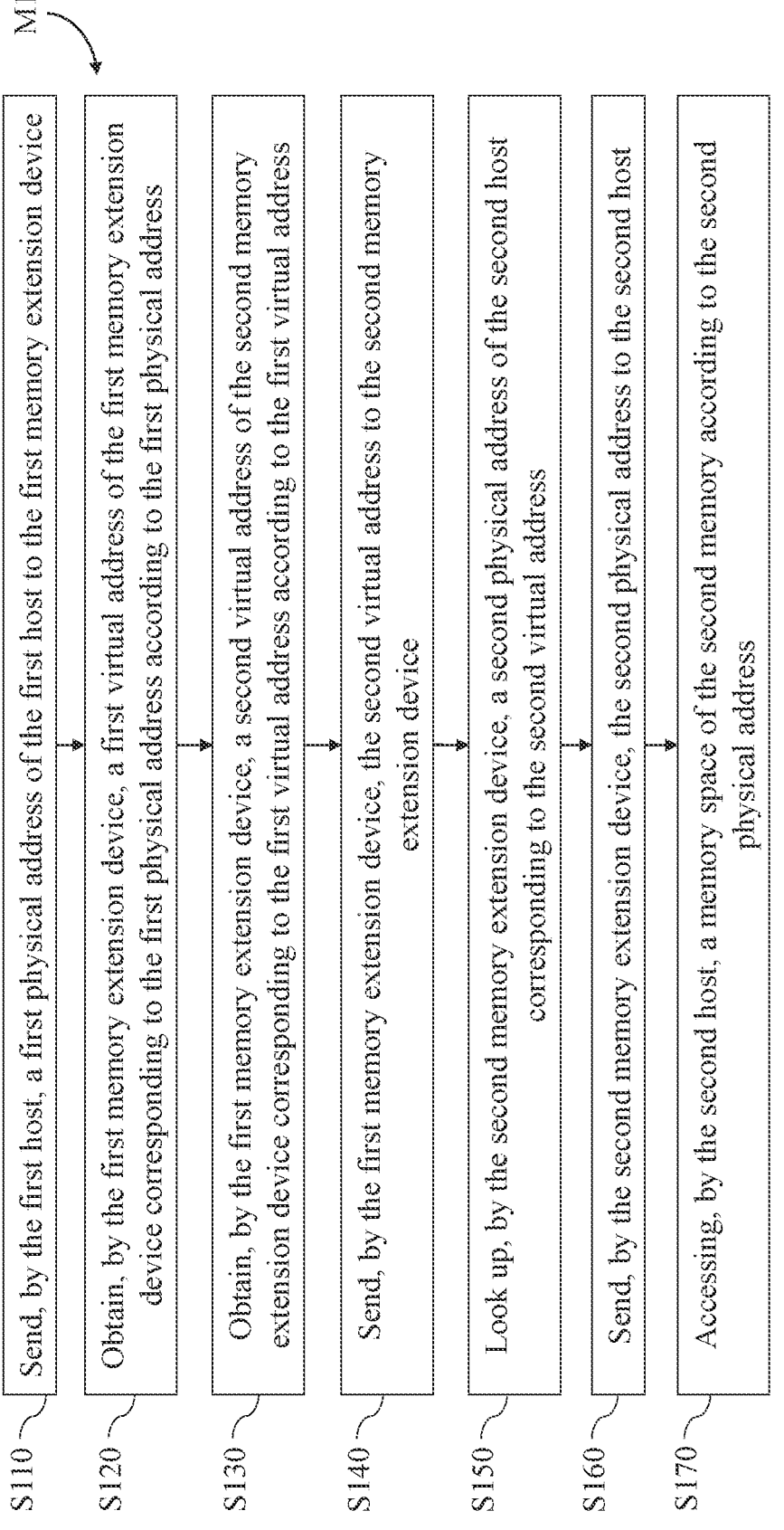

M1

S110 Send, by the first host, a first physical address of the first host to the first memory extension device S120 Obtain, by the first memory extension device, a first virtual address of the first memory extension device corresponding to the first physical address according to the first physical address S130 Obtain, by the first memory extension device, a second virtual address of the second memory extension device corresponding to the first virtual address according to the first virtual address S140 Send, by the first memory extension device, the second virtual address to the second memory extension device S150 Look up, by the second memory extension device, a second physical address of the second host corresponding to the second virtual address S160 Send, by the second memory extension device, the second physical address to the second host S170 Accessing, by the second host, a memory space of the second memory according to the second physical address

FIG. 2

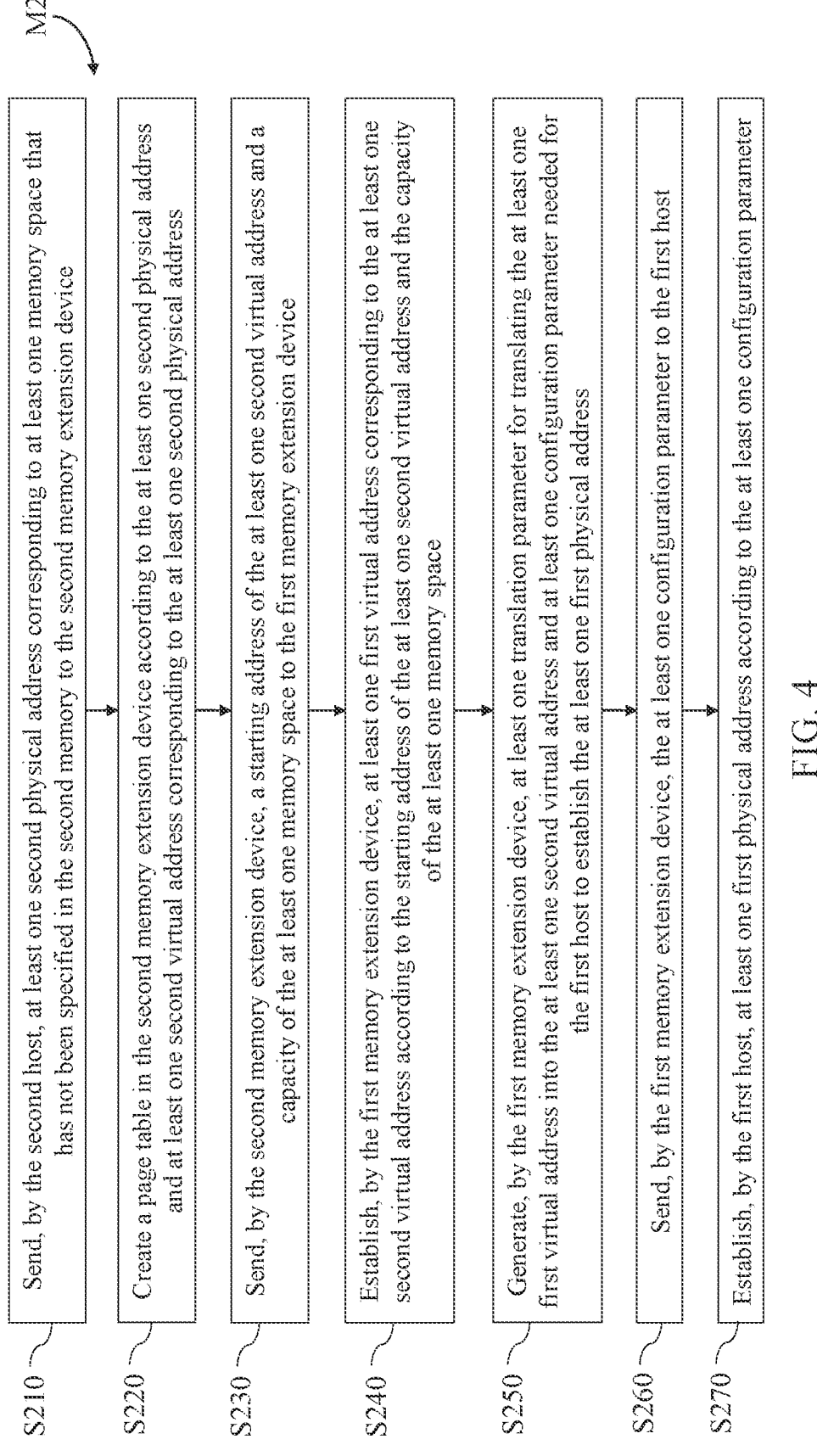

M2

S210 — Send, by the second host, at least one second physical address corresponding to at least one memory space that has not been specified in the second memory to the second memory extension device S220 — Create a page table in the second memory extension device according to the at least one second physical address and at least one second virtual address corresponding to the at least one second physical address S230 — Send, by the second memory extension device, a starting address of the at least one second virtual address and a capacity of the at least one memory space to the first memory extension device S240 — Establish, by the first memory extension device, at least one first virtual address corresponding to the at least one second virtual address according to the starting address of the at least one second virtual address and the capacity of the at least one memory space S250 — Generate, by the first memory extension device, at least one translation parameter for translating the at least one first virtual address into the at least one second virtual address and at least one configuration parameter needed for the first host to establish the at least one first physical address S260 — Send, by the first memory extension device, the at least one configuration parameter to the first host S270 — Establish, by the first host, at least one first physical address according to the at least one configuration parameter

FIG. 4

COMPUTING SYSTEM AND MEMORY SHARING METHOD FOR COMPUTING SYSTEM

CROSS-REFERENCE TO RELATED APPLICATIONS

This application claims priority of China application No. 202211061258.3, filed on Aug. 31, 2022, which is incorporated by reference in its entirety.

BACKGROUND OF THE PRESENT DISCLOSURE

Field of the Present Disclosure

The present disclosure relates to a computing system and, more particularly, to a computing system allowing memory sharing among multiple hosts.

Description of the Prior Art

A cloud computing system may include multiple servers, each of which may include multiple processing units and a memory to be shared among the multiple processing units. When a cloud computing system receives a computing task from a user, the cloud computing system configures one or more processing units and part of the memory into a virtual machine for processing the task according to requirements of the task. In general, a cloud computing system maximizes as much as possible a hardware utilization rate of each server. However, due to different hardware resources needed for individual tasks, the configuration of hardware frequently suffers from restriction, such that the hardware utilization rate of servers may not be effectively improved. For example, if a task requires a larger memory space, than even though there are processing units in the server that are not configured yet, those processing unit may have to remain idle and cannot be configured into virtual machines due to the lack of configurable memory space. In contrast, if a task requires a larger number of processing units and has a lower demand on a memory space, there may be an insufficient number of configurable processing units, causing the remaining configurable memory space to idle. Therefore, there is a need for a solution that provides hardware resource allocation of a computing system with better flexibilities so as to improve the hardware utilization rate.

SUMMARY OF THE PRESENT DISCLOSURE

One embodiment of the present application discloses a computing system. The computing system includes a first host, a second host, a first memory extension device, and a second memory extension device. The first host includes a first memory, the second host includes a second memory. The first memory extension device is coupled to the first host, and comprising a first address management unit. The second memory extension device is coupled to the second host and the first memory extension device, and comprising a second address management unit The first host is configured to access at least one memory space of the second memory through the first memory extension device and the second memory extension device according to at least one first physical address of the first host. The first address management unit is configured to obtain at least one first virtual address of the first memory extension device corresponding to the at least one first physical address according to the at least one first physical address, and to obtain at least one second virtual address of the second memory extension device corresponding to the at least one first virtual address according to the at least one first virtual address. The second address management unit is configured to look up at least one second physical address of the second host corresponding to the at least one second virtual address, and the second host is configured to access the at least one memory space of the second memory according to the at least one second physical address.

Another embodiment of the present application discloses a memory sharing method for a computing system. The computing system includes a first host, a second host, a first memory extension device and a second memory extension device. The first host includes a first memory, and the second host includes a second memory. The first memory extension device is coupled to the first host, and the second memory extension device is coupled to the second host and the first memory extension device. The method includes sending, by the first host, a first physical address of the first host to the first memory extension device; obtaining, by the first memory extension device, a first virtual address of the first memory extension device corresponding to the first physical address according to the first physical address; obtaining, by the first memory extension device, a second virtual address of the second memory extension device corresponding to the first virtual address according to the first virtual address; sending, by the first memory extension device, the second virtual address to the second memory extension device; looking up, by the second memory extension device, a second physical address of the second host corresponding to the second virtual address; sending, by the second memory extension device, the second physical address to the second host; and accessing, by the second host, a memory space of the second memory according to the second physical address.

A computing system and a related method of the present application are capable of enabling multiple hosts to be coupled to one another through memory extension devices, and enabling each host to perform address translation through the corresponding memory extension device so as to access a memory of another host. Thus, even non-consecutive, fragmented memory spaces of a memory can be provided and be accessed by another host. In such case, the computing system can configure hardware resources more flexibly to establish virtual machines, thereby improving the hardware utilization rate of the computing system.

BRIEF DESCRIPTION OF THE DRAWINGS

Aspects of the present disclosure can be better understood by reading the following embodiments in combination with the accompanying drawings below. It should be noted that, according to standard practice in industry, the various structures in the drawings are not drawn to scales. In fact, for description clarity, the sizes of the various structures may be increased or reduced as desired.

FIG. 2 is a schematic diagram of accessing a memory in a method for a computing system according to an embodiment of the present application.

FIG. 4 is a schematic diagram of establishing an address translation mechanism in a method for a computing system according to another embodiment of the present application.

DETAILED DESCRIPTION OF THE EMBODIMENTS

Figure 1:
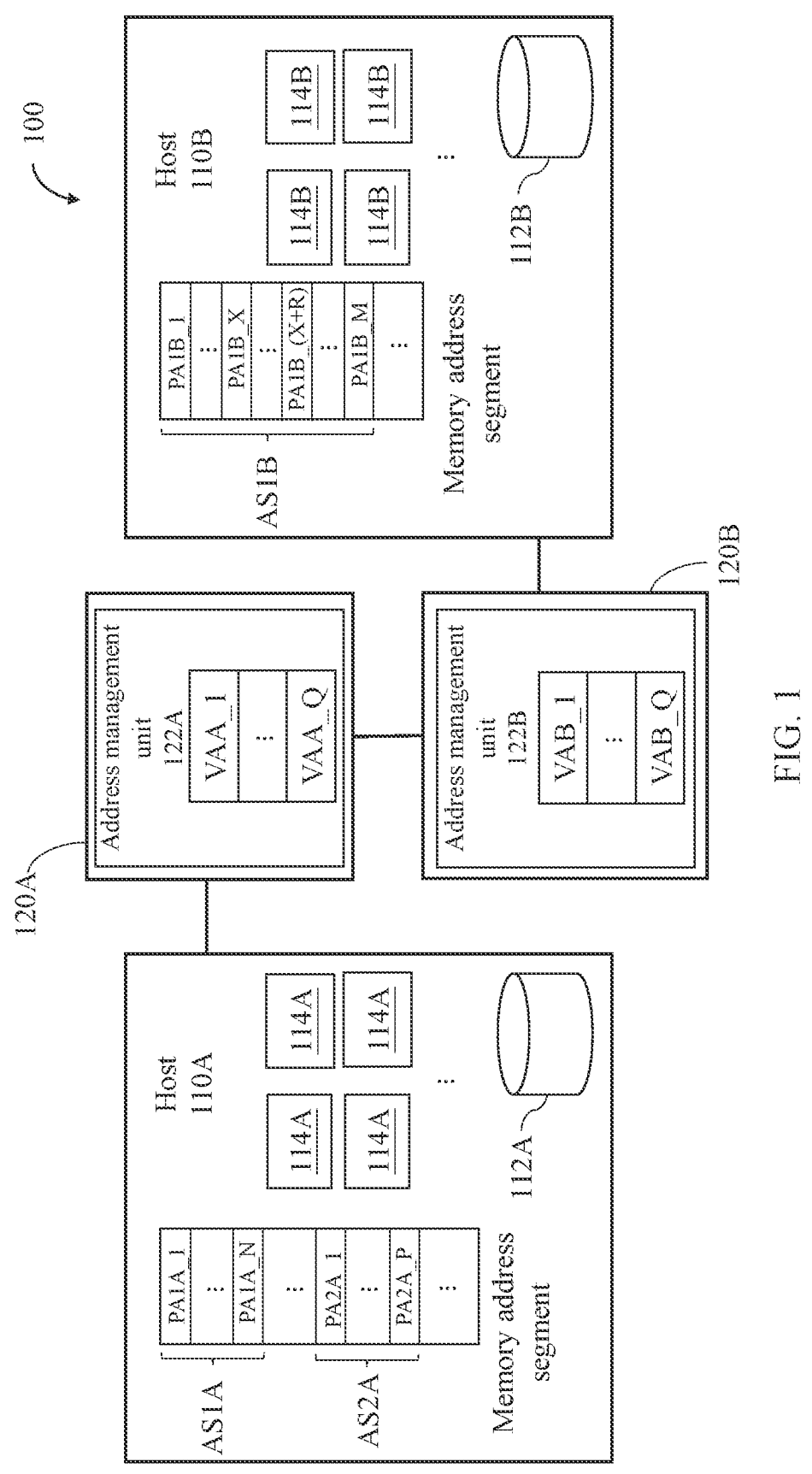
FIG. 1 is a schematic diagram of a computing system according to an embodiment of the present application.

The following disclosure provides various different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "generally" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "generally." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

FIG. 1 shows a schematic diagram of a computing system according to an embodiment of the present application. A computing system 100 includes a host 110A, a host 110B, a memory extension device 120A and a memory extension device 120B. As shown in FIG. 1, the memory extension device 120A may be coupled to the host 110A, and the memory extension device 120B may be coupled to the memory extension device 120A and the host 110B. Moreover, the host 110A may include a memory 112A and at least one processing unit 114A, and the host 110B may include a memory 112B and at least one processing unit 114B. In the present embodiment, the host 110A can access the memory 112B of the host 110B through the memory extension devices 120A and 120B. In such case, the host 110A can configure one or more processing units 114A therein and at least one memory space in the memory 112B of the host 110B into one virtual machine to jointly perform a task.

For example, a physical address space of the host 110A may include multiple segments, wherein physical addresses PA1A_1 to PA1A_N of a memory address segment AS1A may correspond to multiple memory spaces of the memory 112A. Thus, the processing unit 114A in the host 110A can access the corresponding memory space in the memory 112A through the physical addresses PA1A_1 to PA1A_N, where N is an integer greater than 1. Similarly, physical addresses PA1B_1 to PA1B_M of a memory address segment AS1B of the host 110B may correspond to multiple memory spaces of the memory 112B. Thus, the processing unit 114B in the host 110B can access the corresponding memory space in the memory 112B through the physical addresses PA1B_1 to PA1B_M, where M is an integer greater than 1.

Moreover, during configuration of hardware resources of the hosts 110A and 110B, after the processing unit 114B and a part of the memory space in the memory 112B in the host 110B are configured into a virtual machine, the memory 112B may still contain memory spaces remaining configurable. For example, in FIG. 1, in the memory address segment AS1B of the host 110B, the memory space corresponding to the physical addresses PA1B_X to PA1B_(X+R) may still be not yet configured, where X and R are integers greater than 1, and (X+R) is smaller than M. In such case, the computing system 100 may further enable the host 110A to setup another memory address segment AS2A, and, by performing address translation with the memory extension device 120A and the memory extension device 120B, physical addresses PA2A_1 to PA2A_P in the memory address segment AS2A can be corresponding to the physical addresses PA1B_X to PA1B_(X+R) of the memory 112B in the host 110B, where P is an integer greater than 1. In such case, the processing unit 114A in the host 110A can access multiple memory spaces corresponding to the physical addresses PA1B_X to PA1B_(X+R) in the memory 112B through the memory extension device 120A and the memory extension device 120B according to the physical addresses PA2A_1 to PA2A_P.

As shown in FIG. 1, the memory extension device 120A may include an address management unit 122A, and the memory extension device 120B may include an address management unit 122B. The address management unit 122A can obtain virtual addresses VAA_1 to VAA_Q of the memory extension device 120A corresponding to the physical addresses PA2A_1 to PA2A_P according to the physical addresses PA2A_1 to PA2A_P of the host 110A, and can translate the virtual addresses VAA_1 to VAA_Q into virtual addresses VAB_1 to VA2B_Q of the memory extension device 120B corresponding to the virtual addresses VAA_1 to VAA_Q. Next, the address management unit 122B can look up physical addresses PA1B_X to PA1B_(X+R) of the second host 110B corresponding to the virtual addresses VAB_1 to VA2B_Q, and the host 110B can then access multiple corresponding memory spaces in the memory 112B according to the physical addresses PA1B_X to PA1B_(X+R), where Q is an integer greater than 1. As such, even when the configurable memory space in the memory 112A is insufficient, the computing system 100 can still configure the idle processing unit 114A in the host 110A and at least one idle memory space in the memory 112B of the host 110B jointly into a virtual machine, thereby improving the hardware utilization rate of the computing system 100.

In the present embodiment, the hosts 110A and 110B can use the same addressing rule, and each physical address may correspond to a memory space of a same number of bits; therefore, P, Q and (R−1) may be equal values. However, the present application is not limited thereto. In some other embodiments, the hosts 110A and 110B may use different addressing rules, and memory spaces corresponding to the physical addresses of the two may have different number of bits. In such case, P, Q and (R−1) may be different values. Moreover, in the foregoing embodiment, the host 110B provides the multiple physical addresses PA1B_X to PA1B_ (X+R) for the host 110A to access multiple corresponding memory spaces in the memory 112B. However, the present application is not limited to the above example. In some embodiments, the host 110B may also provide a memory space of the memory 112B corresponding to one single physical address PA1B_X for the host 110A to access. In such case, the memory extension devices 120B and 120A can still translate the physical address PA1B_X of the host 110B into the physical address of the host 110A according to the address translation mechanism of the present application, so that the host 110A can access the corresponding memory space in the memory 112B according to the physical address therein.

Figure 3:
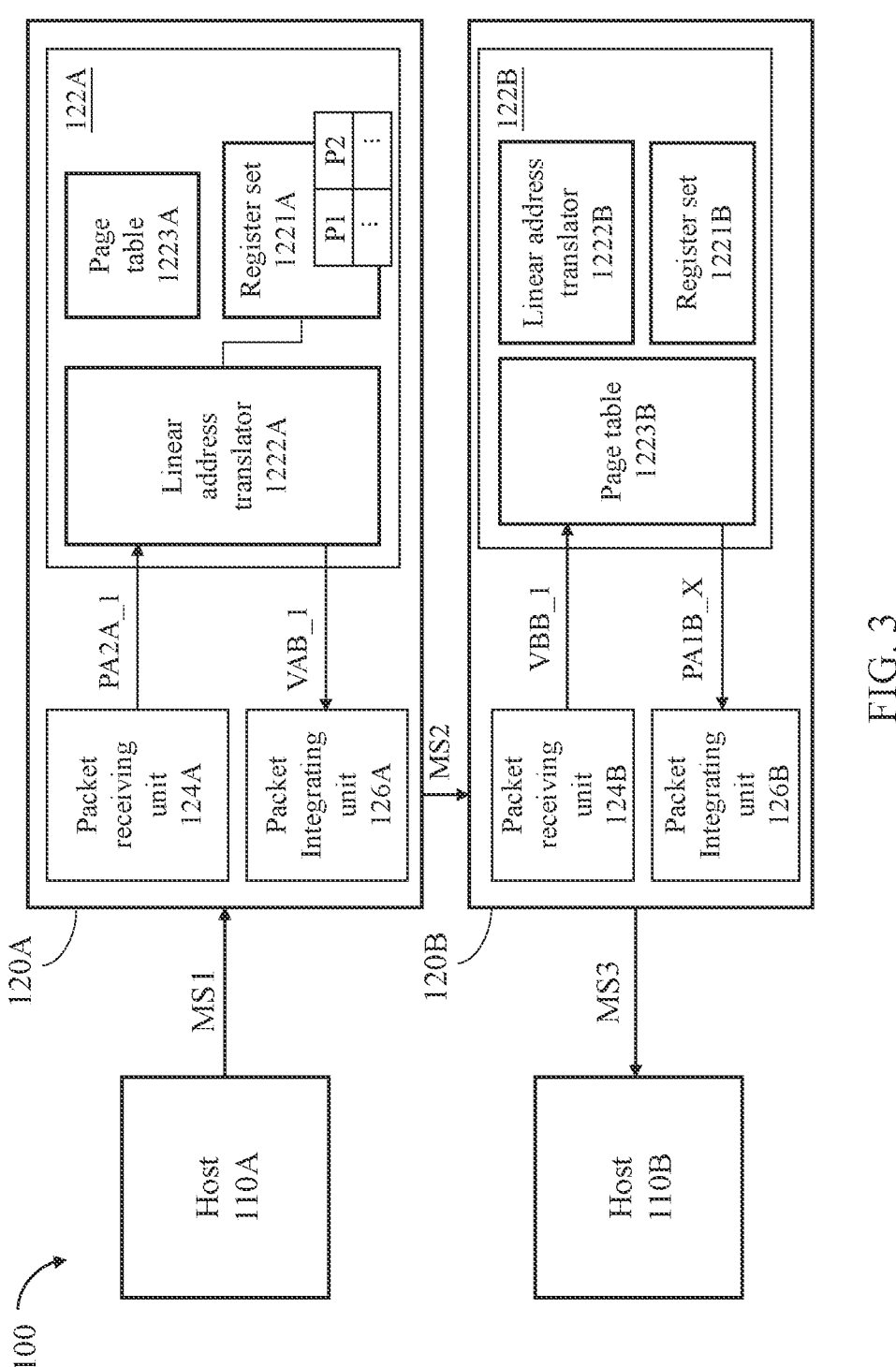
FIG. 3 is a schematic diagram of the computing system in FIG. 1 performing the method in FIG. 2.

FIG. 2 shows a schematic diagram of accessing a memory in a method for a computing system according to an embodiment of the present application. A method M1 for a computing system may include steps S110 to S170, and is applicable to the computing system 100. FIG. 3 shows a schematic diagram of the computing system 100 performing the method M1. In the present embodiment, the host 110A can access the memory space in the memory 112B according to one physical address, for example, the physical address PA2A_1, among the physical addresses PA2A_1 to PA2A_P.

In the present embodiment, the host 110A and the memory extension device 120A can communicate with each other via a consistent interconnection protocol, for example but not limited to, a CXL communication protocol, and the host 110B and the memory extension device 120B can also communicate with each other via the same consistent interconnection protocol. In such case, the host 110A can send a message packet MS1 according to the physical address PA2A_1 in step S110 as shown in FIG. 3, and the memory extension device 120A may further include a packet receiving unit 124A. The packet receiving unit 124A can extract the physical address PA2A_1 from the message packet MS1 according to the specification of the CXL communication protocol, and send the physical address PA2A_1 to the address management unit 122A. However, the present application is not limited to the above example. In some embodiments, the hosts 110A and 110B may also communicate with the memory extension devices 120A and 120B via other types of communication protocols, and the packet receiving units 124A and 124B in the memory extension devices 120A and 120B can also parse packets according to the communication protocol used by the computing system 100. Moreover, in some embodiments, according to the specification of the communication protocol used by the computing system 100, the host 110A may also directly send the physical address PA2A_1 to the memory extension device 120A and does not need to additionally use the packet receiving unit 124A to perform parsing. In such case, the packet receiving units 124A and 124B can also be omitted from the memory extension devices 120A and 120B.

The address management unit 122A may include a register set 1221A and a linear address translator 1222A. The register set 1221A can store a translation parameter P1 and a configuration parameter P2 associated with address translation. When the host 110A sends the message packet MS1 to the memory extension device 120A, the linear address translator 1222A can translate the physical address PA2A_1 in the message packet MS1 into the virtual address VAA_1 according to the configuration parameter P2 stored in the register set 1221A in step S120, and translate the virtual address VAA_1 into a corresponding virtual address VAB_1 of the memory extension device 120B according to at least one translation parameter P1 stored in the register set 1221A in step S130. Next, a packet integrating unit 126A in the memory extension device 120A can encapsulate the virtual address VAB_1 in a message packet M2, for the memory extension device 120A to send the message packet MS2 generated according to the virtual address VAB_1 to the memory extension device 120B in step S140. In some embodiments, according to the specification of the communication protocol used by the computing system 100, the memory extension device 120A may also directly send the virtual address VAB_1 to the memory extension device 120B, and the packet integrating unit 126A for packet encapsulation would not be additionally needed. In such case, the packet integrating unit 126A may be omitted from the memory extension device 120A.

The packet receiving unit 124B in the memory extension device 120B can extract the virtual address VAB_1 from the message packet MS2, and send the virtual address VAB_1 to the address management unit 122B. In the present embodiment, the address management unit 122B of the memory extension device 120B may include a page table 1223B in which the virtual addresses VAB_1 to VAB_Q of the memory extension device 120B and the physical addresses PA1B_X to PA1B_(X+R) of the host 110B corresponding to the virtual addresses VAB_1 to VAB_Q are stored. Thus, in step S150, the memory extension device 120B can search through the page table 1223B to retrieve the physical address PA1B_X of the host 110B corresponding to the virtual address VAB_1. Next, a packet integrating unit 126B in the memory extension device 120B can encapsulate the physical address PA1B_X in a message packet MS3, allowing the memory extension device 120B to send the message packet MS3 generated according to the physical address PA1B_X to the host 110B in step S160. As such, the host 110B can access the memory space in the memory 112B corresponding to the physical address PA1B_X in step S170.

In such case, in addition to configuring at least one processing unit 114A and at least one memory space of the memory 112A therein into a virtual machine VM1, the host 110A can further configure at least another one processing unit 114A and at least one memory space of the memory 112B into a virtual machine VM2. Since the host 110A can access the memory space of the memory 112B of the host 110B through address translation of the memory extension devices 120A and 120B, the computing system 100 is able to configure hardware resources more flexibly to establish virtual machines, thereby improving the hardware utilization rate of the computing system 100.

Figure 5:
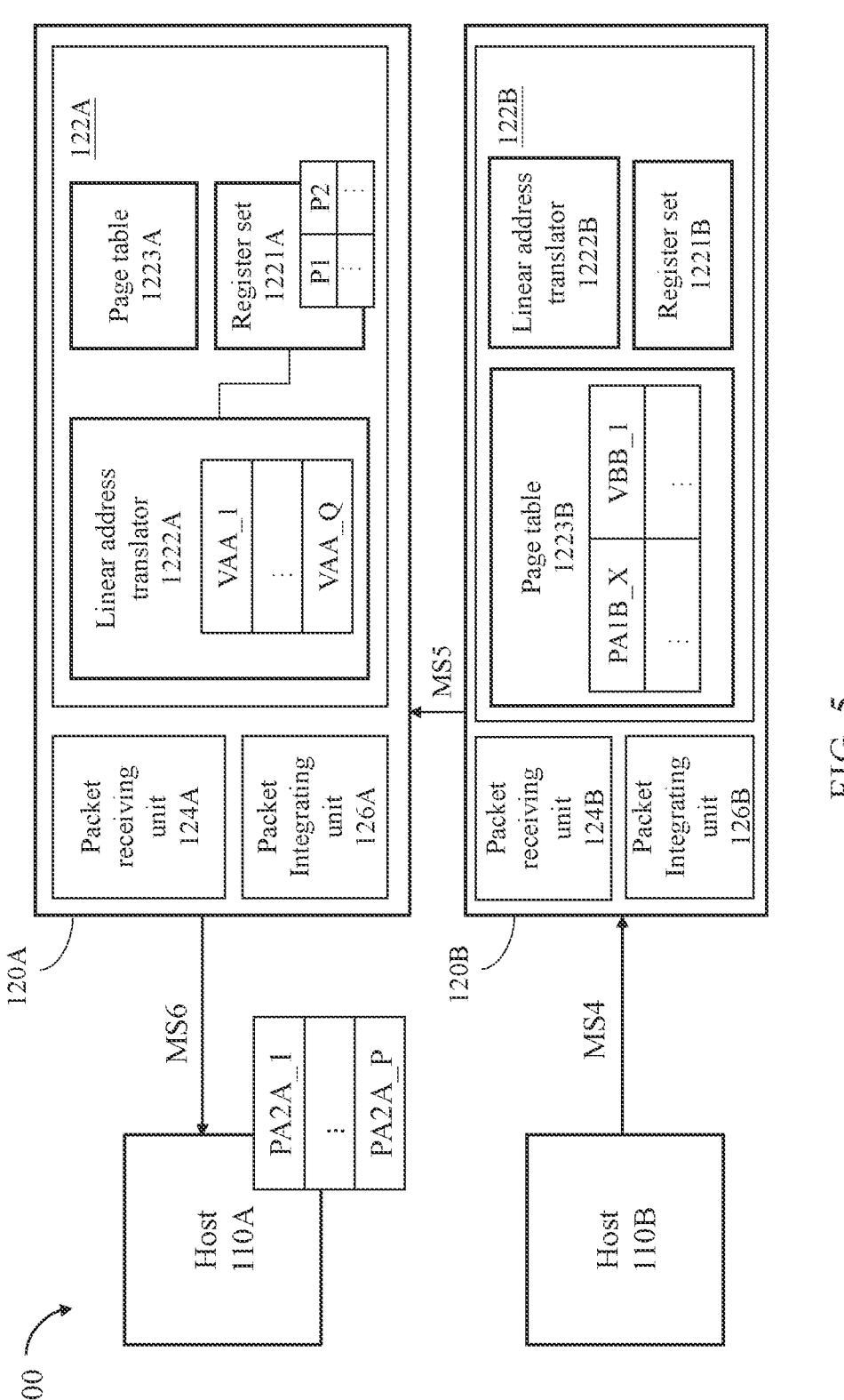
FIG. 5 is a schematic diagram of the computing system in FIG. 1 performing the method in FIG. 4.

Moreover, in order to enable the computing system 100 to perform the method M1 so that the processing unit 114A in the host 110A and the memory 112B of the host 110B can be configured into the virtual machine VM2, the computing system 100 needs to establish an address translation mechanism in advance in the host 110A, the host 110B, the memory extension device 120A and the memory extension device 120B. FIG. 4 shows a schematic diagram of establishing an address translation mechanism in a method for a computing system according to another embodiment of the present application. A method M2 for a computing system includes steps S210 to S270, and an address translation mechanism needed for performing the method M1 can be established in the computing system 100 by the method M2. FIG. 5 shows a schematic diagram of the computing system 100 performing the method M2.

In some embodiments, upon receiving a computing task from a user, the computing system 100 can first configure hardware resources in the host 110A and the host 110B according to hardware requirements of the task, so as to establish corresponding virtual machines. For example, the computing system 100 may configure at least one processing unit 114A and at least one memory space in the memory 112A in the host 110A into at least one virtual machine according to hardware requirements of the task, and configure at least one processing unit 114B and at least one memory space in the memory 112B in the host 110B into at least one virtual machine. Once the configuration in the hosts 110A and 110B is complete, if there is still idle memory space in the memory 112B of the host 110B, the method M2 can be performed to enable the processing unit 114A of the host 110A to access the idle memory space of the memory 112B, and to configure the processing unit 114A of the host 110A and the memory space of the memory 112B jointly into a virtual machine.

In step S210, the host 110B can send the physical addresses PA1B_X to PA1B_(X+R) corresponding to multiple memory spaces that have not been specified, that is, have not been assigned to any virtual machine, in the memory 112B to the memory extension device 120B over a message packet MS4. It should be noted that, although in the present embodiment, the physical addresses PA1B_X to PA1B_(X+R) may correspond to consecutive address segments as shown in FIG. 1, the present application is not limited thereto. In some embodiments, after the host 110B configures the processing unit 114B and the memory 112B into a virtual machine, the remaining configurable memory space in the memory 112B may be scattered in different segments, and may thus correspond to multiple non-consecutive address segments. Moreover, the present application does not limit that the host 110B must send the multiple physical addresses to the memory extension device 120B. In some embodiments, the host 110B can send the physical address of one single memory space that has not been specified in the memory 112B to the memory extension device 120B, and the address translation mechanism can be established for the one single physical address according to the same method M2.

Once the message packet MS4 is received, the memory extension device 120B can parse the message packet MS4 by the packet receiving unit 124B to obtain the physical addresses PA1B_X to PA1B_(X+R), and establish the virtual addresses VAB_1 to VAB_Q corresponding to the physical addresses PA1B_X to PA1B_(X+R) by the address management unit 122B. In step S220, the address management unit 122B can create the page table 1223B according to the physical addresses PA1B_X to PA1B_(X+R) and the corresponding virtual addresses VAB_1 to VAB_Q. In some embodiments, although the configurable memory space in the memory 112B may correspond to multiple non-consecutive address segments, the virtual addresses VAB_1 to VAB_Q may still be consecutive addresses so as to facilitate the subsequent address translation by the memory extension device 120A.

Next, in step S230, the memory extension device 120B can encapsulate information of the starting address of the virtual addresses VAB_1 to VAB_Q and the capacity of the memory space released by the memory 112B into a message packet MS5 by the packet integrating unit 126B, and send the message packet MS5 to the memory extension device 120A. The memory extension device 120A can correspondingly parse the message packet MS5 by the packet receiving unit 124A to obtain all virtual address information of the virtual addresses VAB_1 to VAB_Q. For example, the message packet MS5 may include the starting address and the capacity of the memory space released by the memory 112B, or the message packet MS5 may include the starting address and ending address, so that the packet receiving unit 124A can obtain address information of the virtual addresses VAB_1 to VAB_Q according to the content of the message packet MS5. Next, in step S240, the address management unit 122A can establish virtual addresses VAA_1 to VAA_Q corresponding to the virtual addresses VAB_1 to VAB_Q according to the starting address of the virtual addresses VAB_1 to VAB_Q and the capacity of the memory space released by the memory 112B. In the present embodiment, to simplify address translation computation, the virtual addresses VAA_1 to VAA_Q of the memory extension device 120A may also be consecutive addresses. Thus, in step S130 above, the memory extension device 120A can perform translation between the virtual addresses VAA_1 to VAA_Q and the virtual addresses VAB_1 to VAB_Q by the linear address translator 1222A.

Moreover, while establishing the virtual addresses VAA_1 to VAA_Q, the address management unit 122A may also generate at least one translation parameter P1 correspondingly needed for the linear address translation in step S250, for example, an offset value between the two types of virtual addresses, so as to ensure that the operation of the subsequent address translation can be conducted successfully. Moreover, the mechanism that the host 110A adopts to read the memory 112A may be different form the mechanism that the host 110B adopts to read the memory 112B. Thus, in step S250, the address management unit 122A may correspondingly generate at least one configuration parameter P2 associated with the memory 112B, wherein the at least one configuration parameter P2 includes, for example, the capacity of the memory space (such as the number of bits) corresponding to the physical addresses PA1B_X to PA1B_(X+R) in the memory 112B of the host 110B, so as to ensure that the host 110A can establish the physical addresses PA2A_1 to PA2A_P according to a corresponding mechanism and hence correctly access data in the memory 112B. In the present embodiment, the address management unit 122A can store the at least one translation parameter P1 and the at least one configuration parameter P2 in the register set 1221A.

Next, in step S260, the memory extension device 120A can encapsulate the at least one configuration parameter P2 associated with the memory 112B into an message packet MS6 by the packet integrating unit 126A and send the message packet MS6 to the host 110A. In step S270, the host 110A can establish the physical addresses PA2A_1 to PA2A_P corresponding to the virtual addresses VAA_1 to VAA_Q according to the configuration parameter P2. Once the host 110A has established the physical addresses PA2A_1 to PA2A_P, the parameter for the translation between the physical addresses PA2A_1 to PA2A_P and the virtual addresses VAA_1 to VAA_Q can be sent to the memory extension device 120A, enabling the memory extension device 120A to further translate the physical addresses PA2A_1 to PA2A_P of the host 110A into the virtual addresses VAA_1 to VAA_Q of the memory extension device 120A by the linear address translator 1222A. Consequently, the host 110A can access the memory 112B according to the method M1 shown in FIG. 2.

In the present embodiment, to allow the host 110A to access the memory space of the memory 112B more efficiently, the physical addresses PA2A_1 to PA2A_P can correspond to consecutive address segments. That is to say, although the memory space that the host 110B provides to the host 110A may be fragmentary, the host 110A can still access the memory 112B by means of the consecutive physical addresses PA2A_1 to PA2A_P, thereby alleviating the additional load needed for the host 110A to access the memory 112B.

Moreover, since the physical addresses PA2A_1 to PA2A_P and the virtual addresses VAA_1 to VAA_Q may be consecutive addresses, the address management unit 122A may utilize the linear address translator 1222A to perform not only the translation between the virtual addresses VAA_1 to VAA_Q and the virtual addresses VAB_1 and VAB_Q but also the translation between the physical addresses PA2A_1 to PA2A_P and the virtual addresses VAA_1 to VAA_Q. However, the present application is not limited thereto. In some embodiments, the linear address translator 1222A may further include another processor for performing the translation between the physical addresses PA2A_1 to PA2A_P and the virtual addresses VAA_1 to VAA_Q, or the translation between physical addresses PA2A_1 to PA2A_P and the virtual addresses VAA_1 to VAA_Q may be performed by an existing general-purpose processor in the memory extension device 120A.

Moreover, in some embodiments, since the demands for memory usages may dynamically change during the hosts 110A and 110B configuring virtual machines for computing, the method M2 may be used in such case to rearrange the memory space of the memory 112B that can be used by the host 110A. For example, if the virtual machine of the host 110B requests for more memory space than its original requirements during its operations, to ensure that the virtual machine of the host 110B remains functional, the host 110B may alternatively assign some memory spaces in the memory 112B that are originally accessible for the host 110A to the processing unit 114B in the host 110B. As a result, the host 110B can again perform the method M2 for the host 110A to update the memory spaces that are accessible to the host 110A and again establish corresponding physical addresses, so as to prevent the processing unit 114B from accessing the same memory space.

In the aforementioned embodiments, an example of the host 110A accessing the memory 112B of the host 110B is described. However, in some embodiments, the computing system 100 may also allow the host 110B to access the memory 112A of the host 110A by methods similar to the methods M1 and M2. For example, the host 110A can send the physical addresses corresponding to the configurable memory space in the memory 112A to the memory extension device 120A, and correspondingly establish an address translation mechanism in the memory extension devices 120A and 120B. As such, the host 110B can access the memory space of the memory 112A of the host 110A through the address translation between the memory extension devices 120A and 120B according to the physical addresses set therein.

In the present embodiment, in order to enable the host 110A and the host 110B to access the memory of another host according to requirements thereof, the address management unit 122A of the memory extension device 120A and the address management unit 122B of the memory extension device 120B may be identically structured. That is to say, as shown in FIG. 3 and FIG. 5, the address management unit

122A may further include a page table 1223A, and the address management unit 122B may further include a register set 1221B and a linear address translator 1222B.

In summary, the computing system and the associated methods of the present application allow multiple hosts to be coupled to one another through memory extension devices, so that each host can access the memory of another host through corresponding memory extension devices. Moreover, the computing system is capable of performing address translation by the memory extension devices. Thus, even non-consecutive, fragmented memory spaces of a memory can be provided and be accessed by another host. In such case, the computing system can configure hardware resources more flexibly for establishing virtual machines, thereby improving the hardware utilization rate.

The foregoing description briefly sets forth the features of certain embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein. It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. A computing system, comprising:
a first host, comprising a first memory;
a second host, comprising a second memory;
a first memory extension device, coupled to the first host, and comprising a first address management unit; and
a second memory extension device, coupled to the second host and the first memory extension device, and comprising a second address management unit;
wherein:
the first host is configured to access at least one memory space of the second memory through the first memory extension device and the second memory extension device according to at least one first physical address of the first host,
the first address management unit is configured to obtain at least one first virtual address of the first memory extension device corresponding to the at least one first physical address according to the at least one first physical address, and to obtain at least one second virtual address of the second memory extension device corresponding to the at least one first virtual address according to the at least one first virtual address,
the second address management unit is configured to look up at least one second physical address of the second host corresponding to the at least one second virtual address, and the second host is configured to access the at least one memory space of the second memory according to the at least one second physical address,
the second host is further configured to send the at least one second physical address corresponding to the at least one memory space that has not been specified in the second memory to the second memory extension device,
the second address management unit comprises a page table for storing the at least one second physical address and the at least one second virtual address corresponding to the at least one second physical address, the second memory extension device is further configured to send a starting address of the at least one second virtual address and a capacity of the at least one memory space to the first memory extension device, the first address management unit is further configured to establish the at least one first virtual address corresponding to the at least one second virtual address according to the starting address of the at least one second virtual address and the capacity of the at least one memory space, and to correspondingly generate at least one translation parameter for translating the at least one first virtual address into the at least one second virtual address and at least one configuration parameter needed for the first host to establish the at least one first physical address; and the first host is further configured to establish the at least one first physical address according to the at least one configuration parameter.

2. The computing system according to claim 1, wherein the at least one first virtual address comprises a plurality of consecutive addresses, and the at least one second virtual address comprises a plurality of consecutive addresses.

3. The computing system according to claim 1, wherein the first address management unit comprises:

a register set, configured to store the at least one configuration parameter and the at least one translation parameter; and a linear address translator, configured to, when the first host sends a first message packet to the first memory extension device, translate a first physical address in the first message packet into a first virtual address according to the at least one configuration parameter, and translate the first virtual address into a second virtual address according to the at least one translation parameter, wherein the at least one first physical address comprises the first physical address, the at least one first virtual address comprises the first virtual address, and the at least one second virtual address comprises the second virtual address.

4. The computing system according to claim 3, wherein:

the first memory extension device is further configured to generate a second message packet to the second memory extension device according to the second virtual address;

the second memory extension device is further configured to look up a second physical address corresponding to the second virtual address according to the page table, and to generate a third message packet to the second host according to the second physical address; and the second host is further configured to access a memory space in the second memory corresponding to the second physical address according to the third message packet.

5. The computing system according to claim 1, wherein the first address management unit and the second address management unit are identically structured, and the second host is further configured to access at least one memory space of the first memory through the second memory extension device and the first memory extension device according to at least one third physical address of the second host.

6. The computing system according to claim 1, wherein the at least one second physical address corresponds to a plurality of non-consecutive address segments, and the at least one first physical address corresponds to consecutive address segments.

7. The computing system according to claim 1, wherein the first host and the first memory extension device communicate with each other via a consistent interconnection protocol, and the second host and the second memory extension device communicate with each other via the consistent interconnection protocol.

8. The computing system according to claim 1, wherein the first host further comprises at least one first processing unit and at least one second processing unit, wherein the at least one first processing unit is configured with at least one memory space of the first memory into at least one first virtual machine, and the at least one second processing unit is configured with the at least one memory space of the second memory into at least one second virtual machine.

9. A memory sharing method for a computing system, the computing system comprising a first host, a second host, a first memory extension device and a second memory extension device, the first host comprising a first memory, the second host comprising a second memory, the first memory extension device coupled to the first host, the second memory extension device coupled to the second host and the first memory extension device; the method comprising:

sending, by the second host, at least one second physical address corresponding to at least one memory space that has not been specified in the second memory to the second memory extension device;

creating a page table in the second memory extension device according to the at least one second physical address and at least one second virtual address corresponding to the at least one second physical address;

sending, by the second memory extension device, a starting address of the at least one second virtual address and a capacity of the at least one memory space to the first memory extension device;

establishing, by the first memory extension device, at least one first virtual address corresponding to the at least one second virtual address according to the starting address of the at least one second virtual address and the capacity of the at least one memory space;

generating, by the first memory extension device, at least one translation parameter for translating the at least one first virtual address into the at least one second virtual address and at least one configuration parameter needed for the first host to establish at least one first physical address;

sending, by the first memory extension device, the at least one configuration parameter to the first host;

establishing, by the first host, the at least one first physical address according to the at least one configuration parameter;

sending, by the first host, a first physical address of the first host to the first memory extension device;

obtaining, by the first memory extension device, a first virtual address of the first memory extension device corresponding to the first physical address according to the first physical address;

obtaining, by the first memory extension device, a second virtual address of the second memory extension device corresponding to the first virtual address according to the first virtual address;

sending, by the first memory extension device, the second virtual address to the second memory extension device;

looking up, by the second memory extension device, a second physical address of the second host corresponding to the second virtual address;

sending, by the second memory extension device, the second physical address to the second host; and accessing, by the second host, a memory space of the second memory according to the second physical address;

wherein the at least one memory space comprises the memory space, the at least one second physical address comprises the second physical address, the at least one second virtual address comprises the second virtual address, the at least one first virtual address comprises the first virtual address, and the at least one first physical address comprises the first physical address.

10. The method according to claim 9, wherein:

the at least one first virtual address comprises a plurality of consecutive addresses, and the at least one second virtual address comprises a plurality of consecutive addresses; and the at least one second physical address corresponds to a plurality of non-consecutive address segments, and the at least one first physical address corresponds to consecutive address segments.

11. The method according to claim 9, further comprising:

configuring at least one first processing unit and at least one memory space of the first memory of the first host into at least one first virtual machine; and configuring at least one second processing unit and the at least one memory space of the second memory of the second host into at least one second virtual machine.

12. The method according to claim 9, wherein the first host and the first memory extension device communicate with each other via a consistent interconnection protocol, and the second host and the second memory extension device communicate with each other via the consistent interconnection protocol.

\* \* \* \* \*